US012664279B1

(12) United States Patent
Levites et al.

(10) Patent No.: US 12,664,279 B1
(45) Date of Patent: Jun. 23, 2026

(54) SUSPENSION AND CHARACTERIZATION OF RUNNING PROCESSES FOR COUNTERING RANSOMWARE

(71) Applicant: Halcyon Tech, Inc., Austin, TX (US)

(72) Inventors: Seagen Levites, Oregon City, OR (US);
Jonathan Miller, Poway, CA (US);
Peter Morgan, Scottsdale, AZ (US);
Robert Bushner, Homeland, CA (US);
Ross Bryant, San Antonio, TX (US);
Ryan Smith, Austin, TX (US)

(73) Assignee: Halcyon Tech, Inc., Austin, TX (US)

( * ) Notice: Subject to any disclaimer, the term of this patent is extended or adjusted under 35 U.S.C. 154(b) by 0 days.

(21) Appl. No.: 19/423,919

(22) Filed: Dec. 17, 2025

(51) Int. Cl.
*G06F 21/56* (2013.01)
*G06F 9/48* (2006.01)
*G06F 21/53* (2013.01)
*G06F 21/55* (2013.01)
*G06F 21/60* (2013.01)
*G06F 21/64* (2013.01)

(52) U.S. Cl.
CPC ............ *G06F 21/566* (2013.01); *G06F 9/485* (2013.01); *G06F 21/53* (2013.01); *G06F 21/554* (2013.01); *G06F 21/602* (2013.01); *G06F 21/64* (2013.01)

(58) Field of Classification Search
CPC ................. G06F 21/566; G06F 21/554; G06F 2221/034; G06F 21/568; G06F 21/56; G06F 21/565; G06F 21/552; G06F 21/6218; G06F 21/602; G06F 21/561; G06F 2201/84; G06F 2221/2107; G06F 21/53; G06F 21/55; G06F 21/64
See application file for complete search history.

(56) References Cited

U.S. PATENT DOCUMENTS

| | | | | |
|---|---|---|---|---|
| 11,126,718 B2 * | 9/2021 | Kostyushko | .......... | G06F 21/554 |
| 12,430,438 B1 * | 9/2025 | Chou | .................... | G06F 21/566 |
| 2002/0152188 A1 * | 10/2002 | Crus | .................... | G06F 16/284 |
| 2016/0342789 A1 * | 11/2016 | Perez | ..................... | G06F 21/54 |
| 2016/0365981 A1 * | 12/2016 | Medvinsky | ............. | G06F 21/57 |
| 2018/0114020 A1 * | 4/2018 | Hirschberg | .......... | G06F 21/566 |

(Continued)

FOREIGN PATENT DOCUMENTS

WO    WO-2024165152 A1 *    8/2024    ......... H04L 63/1466

OTHER PUBLICATIONS

Brownor, C., Andersen, P., Fischer, Z., & Osterberg, G. (2024). Ransomware detection using dynamic anomaly matrix for accurate and real-time threat identification. Open Science Framework. (Year: 2024).*

(Continued)

*Primary Examiner* — Zhimei Zhu

(74) *Attorney, Agent, or Firm* — Jones Day

(57) ABSTRACT

Ransomware attacks on computing devices can be thwarted by monitoring runtime execution data associated with processes on a device through an agent. When the agent determines, based on this data, that a process is likely associated with ransomware or other malicious activity—such as by detecting system-call events indicative of file-system encryption or authentication anomalies—it can suspend the process by issuing a kernel-mode thread suspension request that atomically halts all threads. Information about the process can be packaged and later utilized to thwart current and future malicious activity.

30 Claims, 5 Drawing Sheets

(56) References Cited

U.S. PATENT DOCUMENTS

| | | | | |
|---|---|---|---|---|
| 2018/0248896 | A1* | 8/2018 | Challita | G06F 21/554 |
| 2019/0109870 | A1* | 4/2019 | Bedhapudi | H04L 63/0428 |
| 2021/0026961 | A1* | 1/2021 | Underwood | G06F 16/9027 |
| 2023/0247048 | A1* | 8/2023 | Samosseiko | H04L 63/145 |
| | | | | 726/23 |
| 2024/0348451 | A1* | 10/2024 | Ezrielev | G06F 21/568 |
| 2025/0077663 | A1* | 3/2025 | Haak | G06F 21/565 |
| 2025/0077669 | A1* | 3/2025 | Haak | G06F 21/565 |
| 2025/0175498 | A1* | 5/2025 | Strogov | H04L 63/1491 |
| 2025/0245318 | A1* | 7/2025 | Donaldson | G06F 21/568 |
| 2025/0245328 | A1* | 7/2025 | Burtscher | G06F 21/568 |

OTHER PUBLICATIONS

Van der Horst et al., "High Stakes, Low Certainty: Evaluating the Efficacy of High-Level Indicators of Compromise in Ransomware Attribution", 34th USENIX Security Symposium, pp. 4819-4838, Aug. 2025 (Year: 2025).*

* cited by examiner

INITIATE SUSPENSION PROTOCOL BASED ON MONITORING OF RUNTIME DATA ASSOCIATED WITH PROCESS — 310

HALT THREADS ASSOCIATED WITH PROCESS — 320

STORE INFORMATION SUFFICIENT TO ROLL BACK PROCESS — 330

DETERMINE RESOURCES USED BY PROCESS PRIOR TO SUSPENSION — 340

GENERATE PACKAGE CHARACTERIZING PROCESS AND UTILIZED RESOURCES TO THWART RANSOMWARE ATTACK — 350

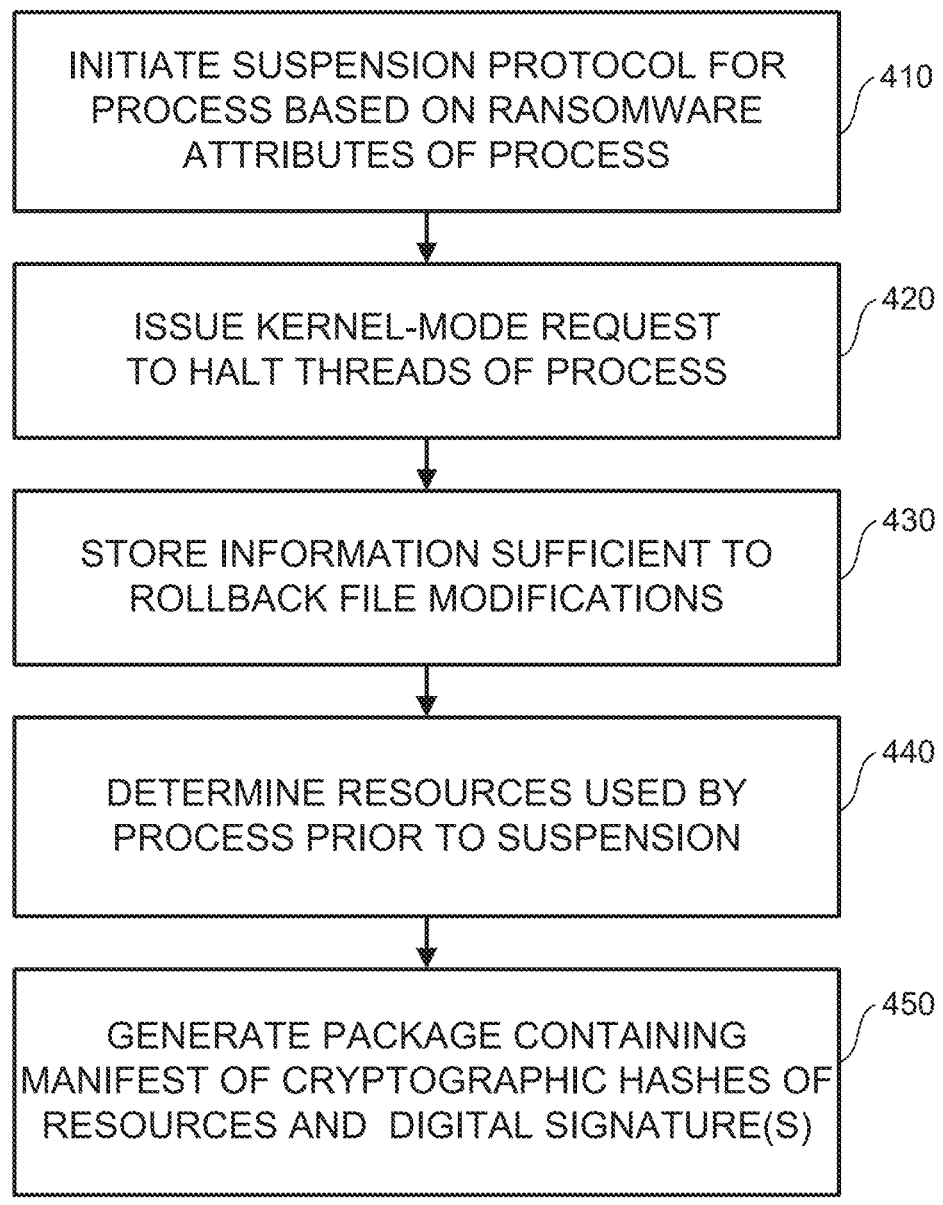

INITIATE SUSPENSION PROTOCOL FOR PROCESS BASED ON RANSOMWARE ATTRIBUTES OF PROCESS — 410

ISSUE KERNEL-MODE REQUEST TO HALT THREADS OF PROCESS — 420

STORE INFORMATION SUFFICIENT TO ROLLBACK FILE MODIFICATIONS — 430

DETERMINE RESOURCES USED BY PROCESS PRIOR TO SUSPENSION — 440

GENERATE PACKAGE CONTAINING MANIFEST OF CRYPTOGRAPHIC HASHES OF RESOURCES AND DIGITAL SIGNATURE(S) — 450

FIG. 4

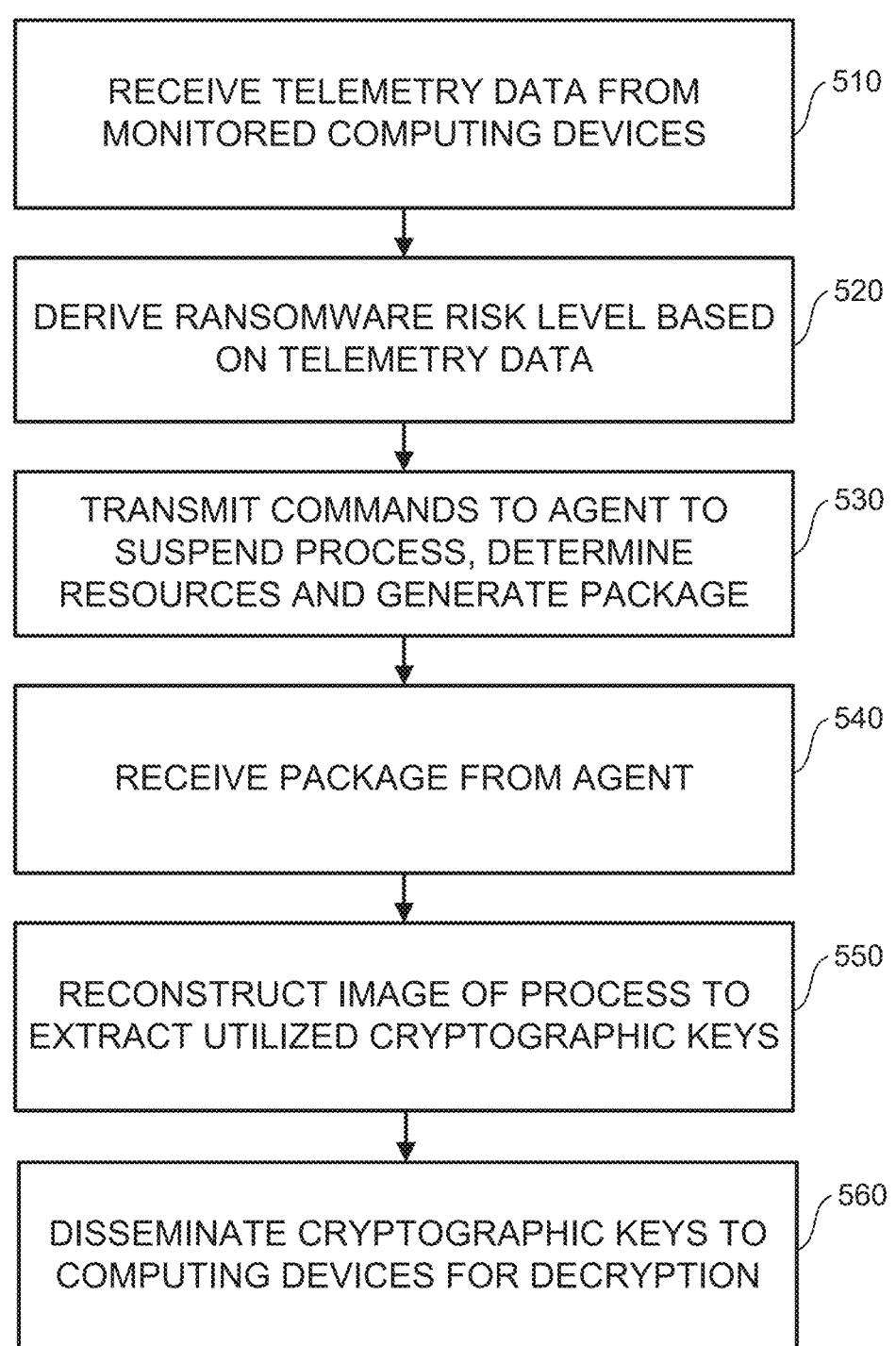

RECEIVE TELEMETRY DATA FROM MONITORED COMPUTING DEVICES ⌐510

DERIVE RANSOMWARE RISK LEVEL BASED ON TELEMETRY DATA ⌐520

TRANSMIT COMMANDS TO AGENT TO SUSPEND PROCESS, DETERMINE RESOURCES AND GENERATE PACKAGE ⌐530

RECEIVE PACKAGE FROM AGENT ⌐540

RECONSTRUCT IMAGE OF PROCESS TO EXTRACT UTILIZED CRYPTOGRAPHIC KEYS ⌐550

DISSEMINATE CRYPTOGRAPHIC KEYS TO COMPUTING DEVICES FOR DECRYPTION ⌐560

FIG. 5

SUSPENSION AND CHARACTERIZATION OF RUNNING PROCESSES FOR COUNTERING RANSOMWARE

TECHNICAL FIELD

The subject matter described herein relates to techniques for thwarting ransomware attacks and other malicious activities through suspending and archiving or otherwise characterizing attributes of processes exhibiting behavior indicative of ransomware.

BACKGROUND

Ransomware routinely encrypts mission-critical data and demands payment for decryption keys. Contemporary security controls attempt to kill the offending process, which (i) may occur mid-write and irreparably corrupt data, (ii) irrevocably discards in-memory secrets required for decryption, and (iii) erases behavioral context that would otherwise improve future detections. To overcome these deficiencies, there is a need for a low-latency technique that both halts encryption activity and preserves the volatile state of the malicious process for subsequent analysis.

SUMMARY

A system is described that can characterize and respond to ransomware attacks on computing devices. The system can monitor runtime execution data associated with processes on a device through an agent. When the agent determines, based on this data, that a process is likely associated with ransomware activity—such as by detecting system-call events indicative of file-system encryption or authentication anomalies—it can suspend the process by issuing a kernel-mode thread suspension request that atomically halts all threads.

Before or during suspension, the agent can store information in a temporal data-protection journal to enable rollback of file modifications. The agent can enumerate resources used by the process, including memory pages, loaded executable modules, open file handles, registry keys, named pipes, mutexes, and active network sockets. A package can then be generated that characterizes the process and the determined resources. The package can be compressed, encrypted and transferred by the agent to a remote computing device. In some variations, the package can include a manifest of cryptographic hashes of the resources or a digital signature. The package can, in some variations, be compressed and encrypted using symmetric encryption, with the key protected by a public-key infrastructure certificate.

The package can also include a replay script which, when executed, recreates the process in a sandbox environment for behavioral analysis. The agent can digitally sign the package and transmit it to a remote analysis service over a mutually authenticated secure channel. At the remote analysis service, an in-memory image of the suspended process can be reconstructed from the package, and cryptographic keys used by the ransomware can be automatically extracted. These keys can then be stored so that they can subsequently be disseminated to additional computing devices to decrypt data encrypted by the ransomware. Further, in some variations, the agent can terminate the suspended process to prevent further malicious activity if such process was not terminated upon safe removal of the package from the monitored computing device.

The system can further update ransomware-detection models based on behavioral features extracted from the package and transmit updated models to some or all monitored computing device. These ransomware-detection models can take varying forms including, for example, an engine which executes rules and/or heuristics, and/or one or more machine learning models.

The monitoring platform can aggregate telemetry from multiple devices, including login activity, network access requests, and system modifications, to derive a risk level for processes. If the risk level exceeds a threshold, the platform can command the agent (as well as other agents including external security agents) to suspend processes, collect resources, and generate packages as described. The system can also adjust authentication techniques for applications, processes, or devices in response to elevated risk levels.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The current subject matter provides various technical advantages. For example, the current subject matter provides a coordinated approach to detecting, suspending, analyzing, and mitigating ransomware attacks across a network of computing devices, enabling rapid response and recovery through automated extraction and dissemination of decryption keys and behavioral intelligence.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 4 is a diagram illustrating a third workflow for suspending and characterizing running processes for countering ransomware; and FIG. 5 is a diagram illustrating a fourth workflow for suspending and characterizing running processes for countering ransomware.

DETAILED DESCRIPTION

The current subject matter is directed to techniques for disrupting malicious activity—such as ransomware—on monitored computing devices. When behavior indicative of an attack is detected, the system initiates remediation actions, including suspending or terminating implicated processes, and captures detailed information about those processes at the time of intervention (and earlier, if available). The collected data is then packaged for use in subsequent remediation, analysis, and other countermeasures to neutralize the current threat and prevent future attacks.

Figure 1:
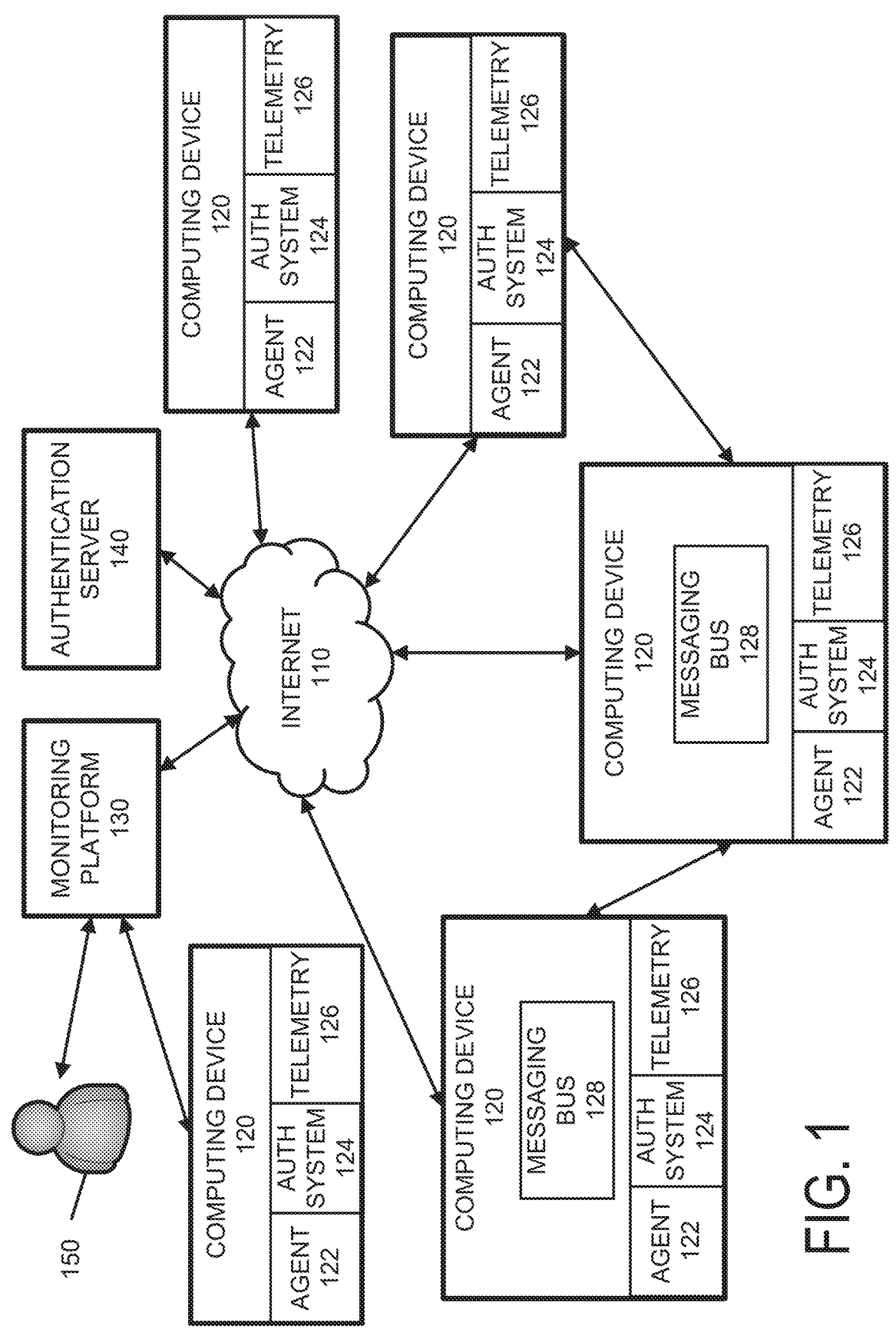
FIG. 1 is an architecture diagram illustrating aspects of a security monitoring platform in which agents are installed on computing devices.
Figure 2:
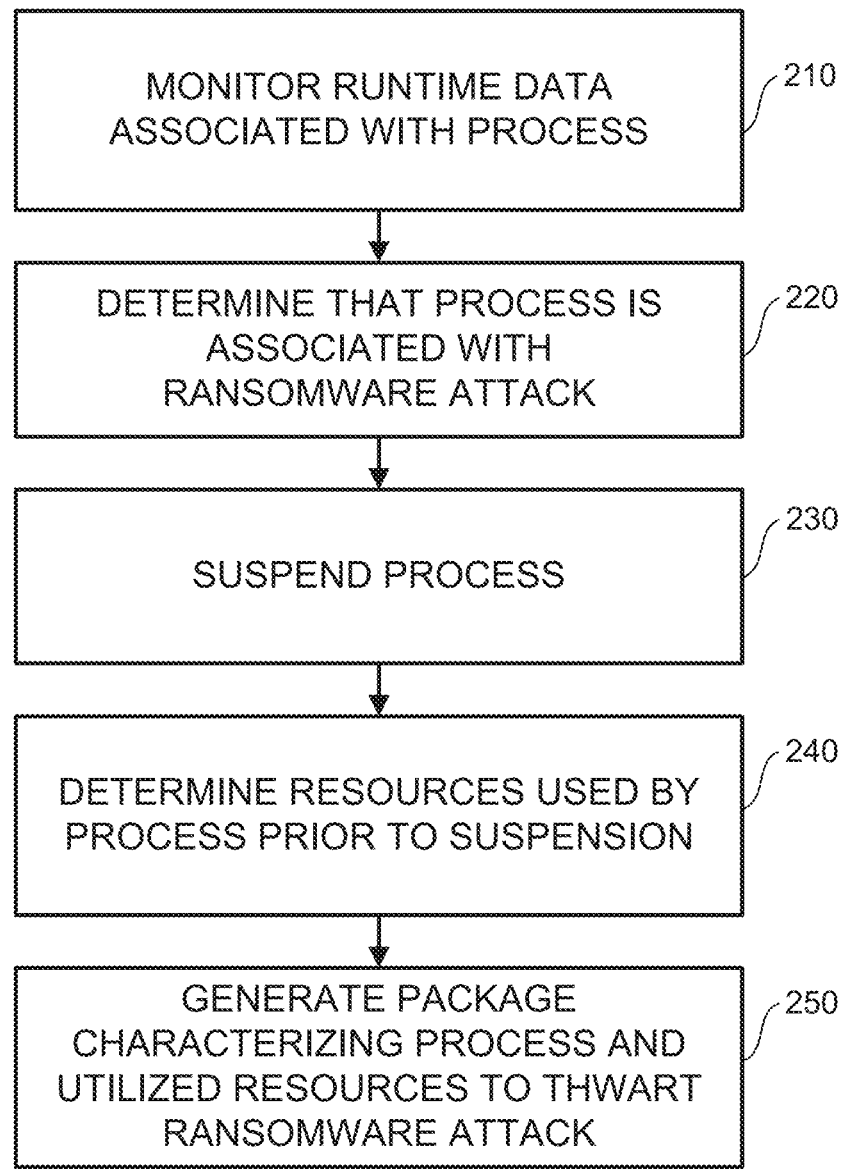
FIG. 2 is a diagram illustrating a first workflow for suspending and archiving running processes for countering ransomware.

FIG. 1 is an architecture diagram in which a monitoring platform 130 can monitor and protect a plurality of computing devices 120 (e.g., endpoints, etc.) by way of the Internet 110 or by way of direct connections (e.g., on-premise protection, etc.). Each of the monitored computing devices 120 can include or otherwise execute at least one agent 122 which can execute or interface with an authentication system 124 and one or more telemetry components 126. The monitoring platform 130 can communicate with one or more users forming part of a Security Operations Center (SOC) 150. The SOC 150 can, for example, comprise ransomware detection and response teams which can initiate one or more authentication processes in order to thwart a ransomware attack or other malicious activity on the monitored computing devices 120.

The authentication system 124 is a local application and/or process to selectively provide access to resources when a user is authenticated. The authentication system 124 can execute local authentication measures and/or it can interface with a remote authentication server 140.

The telemetry components 126 can be executed on the computing device and can individually or in combination be used to locally analyze security events and/or to transmit data to the monitoring platform 130 (i.e., cloud-based platform, etc.) which characterize security events. In some cases, the telemetry component 126 solely works locally while, in other variations, the telemetry component 126 works in coordination with the monitoring platform 130. The computing environment can also include an authentication platform 140 which can be accessed via an API to provide authentication services to applications and processes on the various computing devices 120. The authentication platform 140 can also interface or otherwise consume information generated by the telemetry component 126. In some cases, some or all of the functionality of the monitoring platform 130 can be performed, for example, locally on the computing device 120 (e.g., by the agent 122 and/or the telemetry component 126). Similarly, in some cases, some or all of the functionality of the authentication platform 140 can be performed, for example, locally on the computing device 120 (e.g., by the agent 122 and/or the telemetry component 126). In some cases, the authentication platform 140 can implement more secure authentication techniques when a ransomware attack is suspected or had otherwise commenced. When the authentication platform 140 acts as a service, the authentication techniques for particular applications, processes, and/or computing devices 120 can be dynamically adjusted on such authentication platform 140. In addition or in the alternative, the authentication platform 140 can send commands/signals to the various computing devices 120 which result in the particular authentication scheme used at the computing device 120 to be accordingly modified.

In some cases, the computing device 120 can execute a messaging bus 128 which selectively processes and transmits messages characterizing security events. The messaging bus 128 can generate, process, and transmit messages that are derived from security events generated or identified by the agent 122 or the telemetry component 126 and/or from other sources executing on the corresponding computing device 120 or a peer computing device 120. Further details regarding the messaging bus 128 can be found in U.S. Pat. No. 12,130,914, the contents of which are hereby fully incorporated by reference. In some cases, the computing device 120 can also execute a kernel model such as described in U.S. patent application Ser. No. 19/084,548 filed on Mar. 19, 2025, the contents of which are hereby fully incorporated by reference.

In some cases, the agent 122 can be installed after a security event such as a ransomware attack. With this example, ransomware has already infiltrated at least one of the computing devices 120 and encrypted certain files for which a decryption key will be provided in exchange for a ransomware payment. In such cases, the agent 122 can be installed on the computing device(s) 120 to facilitate remediation of the security event. In the case of ransomware, the remediation can include decrypting the encrypted files and/or transporting the encrypted files to the monitoring platform 130 (or to a different cloud-based service). In order to facilitate local decryption, the agent 122 can collect information characterizing the encrypted files. For example, the agent 122 can identify or generate a list of files that were encrypted as well as the key material used in the encryption of each particular file. In order to identify the encrypted files, an algorithm can analyze the file name, extension and contents of a particular file to see if it is encrypted. Key material, in this context, refers to variables needed to generate a key which can be dependent on the utilized encryption algorithm. The encryption information can be used to generate and deliver decryptor logic (i.e., logic/code to decrypt encrypted files) in the form of a surveyor transported in the form of a surveyor package. A surveyor can be a standalone component that can be run by the agent 122 in order to extend the functionality of the agent 122. The surveyor, when executed by the agent 122, can cause the encrypted files to be decrypted. In some cases, even if the decryptor logic is the same (i.e., a same encryption technique is used for all files), the key materials for each file might be different. Further details regarding surveyors and the updating of agents can be found in U.S. patent application Ser. No. 18/948,343 filed on Nov. 14, 2024, the contents of which are hereby fully incorporated by reference.

The monitoring platform 130 can take telemetry data from the telemetry components 126 on the computing devices 120 (i.e., endpoints, etc.) and use individual endpoint telemetry data and telemetry from a plurality of endpoints, determines the current likelihood that a ransomware or other malicious attack is underway by deriving a risk level. The telemetry components 126 can, by way of the respective messaging buses 128, individually transmit data characterizing information such as intra-process and inter-process behavior, static analysis of machine instructions, and authentication anomalies. The telemetry components 126 can, for example, capture information such as login timestamps, login failure counts, login locations, network folder access requests, network file enumeration requests, privileged processes access requests, process security context, modifications to system settings, and the like. This information can be aggregated by the monitoring platform 130 across multiple computing devices 120 to provide higher level computing environment telemetry such as patterns among computing device 120, and telemetry from network devices in order to determine the likelihood that an attack is taking place.

The agent 122 executing on a monitored computing device 120 monitors process runtime data and determines whether a process is associated with a ransomware attack. Monitoring can include intercepting system-call events indicative of ransomware activity, such as file-system encryption behavior. The determination can rely on the agent 122 detecting attributes including attempts to disable security services, escalate privileges, delete backups and shadow copies, scan for and move laterally to other network targets, perform high-volume sequential file read/write operations, rename files with suspicious extensions, create ransom notes, communicate with external command-and-control servers, and consume abnormally high CPU or other system resources. The agent 122 can apply rules, heuristics, and/or machine-learning models to make this determination. Additionally or alternatively, via the messaging bus 128, the agent 122 can send process telemetry to the monitoring platform 130, which can perform the determination using more computationally expensive models than those executed locally by the agent 122.

The machine-learning models used to assess whether a process exhibits malicious, ransomware-like behavior can include classifiers trained on historical ransomware execution profiles. Behavioral features extracted from the monitored process can be used to update and improve the ransomware-detection model. The agent 122 can also store a reference to a temporal data-protection journal so that, upon obtaining decryption keys, encrypted files can be rolled back to their pre-encryption state.

Deriving a risk level can include aggregating telemetry across devices, such as login timestamps, counts of failed logins, login locations, network folder access requests, network file enumeration requests, privileged process access requests, and modifications to system settings. A command can further instruct the agent 122 to store a reference to the temporal data-protection journal so that, after receipt of disseminated cryptographic keys, encrypted files can be rolled back to a pre-encryption state.

Upon detection of ransomware-like behavior, the agent 122 or the monitored computing device 120 can suspend— or, if warranted, terminate—the implicated process. Suspension can be performed by issuing a kernel-mode thread-suspension request that atomically halts all process threads. Suspension can also be performed or otherwise effected by programmatically sending operating system signals to the process (e.g., SIGSTOP on Unix/Linux, SuspendThread on Windows), leveraging automated resource-management policies that pause processes upon excessive usage or contention, and/or by using monitoring agents that automatically pause processes under predefined conditions (e.g., deadlock prevention, resource exhaustion, or security-policy enforcement). These mechanisms enable suspension without manual intervention, ensuring efficient, controlled resource management.

Agent 120 and/or the monitored computing device 120 can determine the operational state of a process, including the resources it was using immediately before suspension. In some cases, this analysis, including the resource characterization, can be for the entire lifespan of the process (and not just immediately before suspension). Resource determination can include enumerating memory pages, loaded executable modules, open file handles, registry keys, named pipes, mutexes, and active network sockets associated with the process, and the like. These resources can include one or more of memory usage (e.g., working set, private bytes, heap, stack, and memory-mapped files, etc.), open file handles, active network connections, thread and handle information, CPU register state, environment variables, command-line arguments, and loaded modules or libraries, and the like. In other variations, resource determination can include accessing files implicated by the process and/or registry settings.

The agent 122 and/or the monitoring computing device 120 can bundle information describing the suspended processes into a secure package. During creation, the system can, in one variation, compute cryptographic hashes for each enumerated resource and record them in a manifest, sign the package with a device-specific private key to enable subsequent integrity verification, and compress and encrypt the contents using symmetric encryption with the session key wrapped by a PKI certificate associated with the security operations center account. The package can also include a replay script capable of reconstructing the process in a sandbox (i.e., A sandbox creates a controlled, isolated environment using technologies like virtual machines or containers to mimic a real operating system) for behavioral analysis. In this context, the sandbox can be an isolated, instrumented execution environment that mirrors key operating system interfaces while preventing any interaction with production networks, filesystems, or credentials. The sandbox provides controlled visibility into process behavior—such as API calls, memory allocations, inter-process communications, and network egress attempts—without risking lateral movement or data exfiltration. The sandbox can be policy-configurable to emulate different endpoint profiles, inject test inputs, and time-warp execution, enabling deterministic, repeatable analysis across diverse threat scenarios.

The package can be transmitted to the monitoring platform 130 (e.g., a remote analysis service) over, for example, a mutually authenticated secure channel. At this point, in most cases, the process can be terminated by the agent 122. At the monitoring platform 130, an in-memory image of the suspended process can be reconstructed from the package and cryptographic keys used by the ransomware attack can be automatically extracted. The extracted keys can be stored so that they can be subsequently disseminated to additional computing devices to decrypt data encrypted by the ransomware attack. After creating the package, if the process is still in the suspended state, it can be terminated to prevent continuation of malicious activity.

A coordinated ransomware response can be orchestrated by the monitoring platform 130 that receives telemetry from multiple monitored computing devices 120, derives a risk level indicating a likelihood that a particular process on a particular device is associated with a ransomware attack, and, when the risk exceeds a threshold, issues a command to the respective agent on that device to suspend the process, determine resources used prior to suspension, and generate the package. The monitoring platform 130 can receive the package, reconstruct an in-memory image of the suspended process, automatically extract cryptographic keys, and disseminate the keys to one or more monitored computing devices 120 (as well as other computing devices) to decrypt impacted data. Such decryption, as noted above, can be used in coordination with the agent(s) 122 and can utilize decryptor logic. Decryptor logic can be generated as a surveyor package and delivered to the agent 122 to cause decryption of encrypted files on the affected device. When the risk level exceeds the threshold, authentication techniques for particular applications, processes, or devices can be adjusted via the authentication system 124. Reconstructing the in-memory image can include rehydrating the process in a sandbox environment and executing a replay script included in the package.

Figure 3:
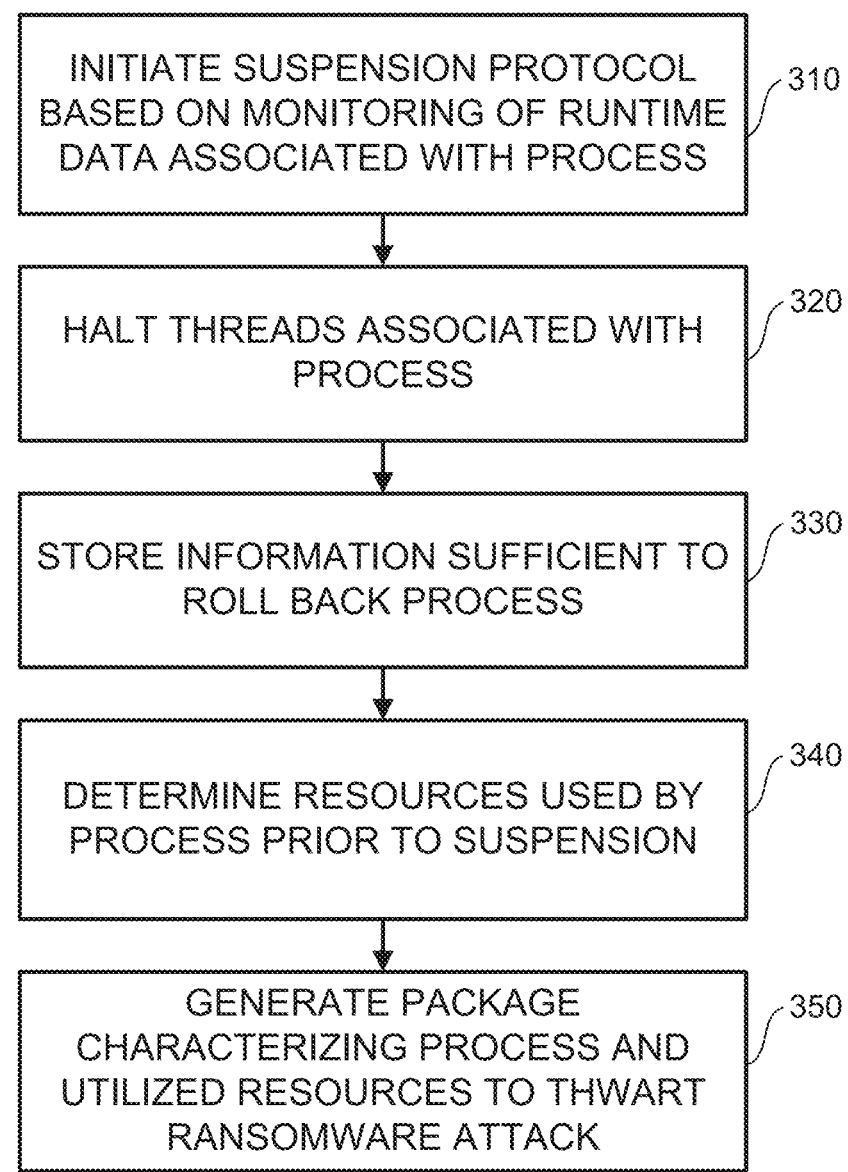
FIG. 3 is a diagram illustrating a second workflow for suspending and characterizing running processes for countering ransomware.

FIG. 3 is a diagram in which, at 310, an agent executing on a monitored computing device, monitors runtime execution data associated with a process. The runtime execution data is used to determine, at 320, that the process is associated with a ransomware attack so that, at 330, the process can be suspended. A determination is made, at 340, as to which resources were being used by the process prior to the suspension. A package is generated, at 350, which characterizes the process and the determined resources used by the process. The package can be used to thwart a current and/or future ransomware attacks. In particular, these packages can be used to provide real-time monitoring of processes by comparing resource usage of subsequent processes with resource usage of known malicious processes.

FIG. 4 is a diagram for transactionally suspending and archiving a suspected ransomware process on a computing device. Initially, at 410, a suspension protocol is initiated based on monitored runtime events associated with a process and, in response to determining that the process exhibits behavior indicative of ransomware, initiating a suspension protocol. A kernel-mode request is issued, at 420, during the suspension protocol which atomically halts all threads of the process. Prior to or contemporaneously with the suspension, at 430, information sufficient to roll back file modifications associated with the process are storing in a temporal data-protection journal. Thereafter, at 440, resources used by the process prior to suspension are determined. A package is generated, at 450, that characterizes the process and the determined resources. The package includes a manifest of cryptographic hashes of the resources and a digital signature and can be used to thwart ransomware activity.

FIG. 5 is a diagram for coordinated ransomware response performed by a monitoring platform. Initially, at 510, telemetry from a plurality of computing devices is received. The telemetry includes runtime execution data associated with processes. Based on the telemetry, at 520, a risk level indicating a likelihood that a particular process on a particular computing device is associated with a ransomware attack is derived. Thereafter, at 530, responsive to the risk level exceeding a threshold, a command is transmitted to an agent on the particular computing device to suspend the particular process and to determine resources used by the process prior to suspension. A package is generated, at 540, which characterizes the process and the determined resources. The package is received, at 550, from the particular computing device. An in-memory image of the suspended process is reconstructed, at 560, from the package so that all cryptographic keys used by the ransomware attack can be automatically extracted. The extracted cryptographic keys are disseminated, at 570, to one or more computing devices to decrypt data encrypted by the ransomware attack.

Some or all aspects of the workflow or other operations described herein can be implemented by agents. In this context, agents, or AI agents, are autonomous software entities that utilize advanced artificial intelligence techniques—including large language models (LLMs), reinforcement learning (including contextual bandits), planning and scheduling algorithms, and other machine learning methods—to perceive their environment (potentially across text, images, audio, video, sensor streams, and structured data), interpret complex information, make context-aware decisions under uncertainty, and execute actions to achieve objectives defined by human operators or higher-level policies.

Such agents can orchestrate end-to-end pipelines by routing requests, performing semantic task decomposition, and coordinating data flow among heterogeneous components (e.g., rule engines, retrieval systems, analytics services, and specialized ML models). They can dynamically select and parameterize models (semantic routing, few-shot configuration, prompt/program synthesis), manage tool invocation (APIs, databases, vector stores, message queues, Robotic Process Automation (RPA), robotic/IoT actuators), and adapt behavior based on intermediate results, user feedback, or changing requirements. Agents can maintain short- and long-term memory, ground reasoning via retrieval-augmented generation, and update knowledge bases while enforcing data governance, privacy, and security constraints (e.g., PII redaction, access control, secret management, key rotation, policy enforcement).

Agents can operate singly or in multi-agent systems using patterns such as manager-worker, marketplace/contract-net, blackboard, and swarm collaboration, with negotiation, role assignment, and consensus. They support human-in-the-loop review and escalation, approval workflows, and guardrails (content filtering, compliance checks, safety policies). Operational capabilities include real-time monitoring, telemetry and tracing, drift and anomaly detection, self-healing retries and fallbacks, circuit breaking, autoscaling, batching and caching, cost/latency/energy optimization, A/B testing, canary releases, and continuous training or fine-tuning. They can manage data preparation and automated feature extraction, perform simulation and sandbox testing, ensure provenance with lineage and signed attestations, and produce detailed audit logs, explanations, uncertainty estimates, and rationales appropriate for regulated environments.

Deployment contexts include cloud, on-premises, edge, and air-gapped or intermittent-connectivity settings, with support for offline modes, state checkpoints, idempotent operations, and transactional guarantees. Through these capabilities, agents enable robust, transparent, and scalable automation across discovery, decision-making, execution, and continuous improvement with minimal human intervention while preserving oversight and accountability.

Various implementations of the subject matter described herein can be realized in digital electronic circuitry, integrated circuitry, specially designed application-specific integrated circuits (ASICs), field-programmable gate arrays (FPGAs), tensor processing units (TPUs), neural processing units (NPUs), or other artificial intelligence (AI) accelerators, computer hardware, firmware, software, and/or any combination thereof. Implementations can execute on heterogeneous, distributed, and/or virtualized computing environments, including on-premises systems, cloud platforms (public, private, hybrid, multi-cloud), edge and fog nodes, mobile and embedded devices, and Internet-of-Things (IoT) endpoints. Implementations can be embodied in one or more computer programs or non-transitory computer program products executable and/or interpretable on a programmable system including at least one programmable processor (e.g., central processing unit (CPU), graphics processing unit (GPU), digital signal processor (DSP), tensor processing unit (TPU), neural processing unit (NPU)), which can be special- or general-purpose, coupled to receive data and instructions from, and to transmit data and instructions to, one or more storage systems, input devices, and output devices.

These computer programs (also referred to as programs, software, applications, services, microservices, functions, or code) include machine instructions for a programmable processor and can be implemented in high-level, procedural, object-oriented, functional, reactive, dataflow, and/or scripting languages; domain-specific languages; and/or assembly or machine languages. Programs can include hardware description languages (e.g., hardware description languages such as Verilog, VHSIC Hardware Description Language (VHDL), System Verilog) and accelerator programming models (e.g., Open Computing Language (OpenCL), SYCL). As used herein, "machine-readable medium" refers to any non-transitory computer program product, apparatus, and/or device (e.g., magnetic disks, optical disks, solid-state drives, random access memory (RAM), read-only memory (ROM), Flash, electrically erasable programmable read-only memory (EEPROM), non-volatile memory express (NVMe), three-dimensional XPoint (3D XPoint), magnetoresistive random-access memory (MRAM), phase-change random-access memory (PCRAM), and programmable logic devices (PLDs)) used to provide machine instructions and/or data to a programmable processor, including via a machine-readable signal. The term "non-transitory" as used herein excludes transitory propagating signals per se, but does not exclude information stored on non-transitory media. A "machine-readable signal" refers to any signal used to provide machine instructions and/or data to a programmable processor, including wired and wireless signals.

These computer programs (also referred to as programs, software, applications, services, microservices, functions, or code) include machine instructions for a programmable processor and can be implemented in high-level, procedural, object-oriented, functional, reactive, dataflow, and/or scripting languages; domain-specific languages; and/or assembly or machine languages. Programs can include hardware description languages (e.g., hardware description languages such as Verilog, VHSIC Hardware Description Language (VHDL), System Verilog) and accelerator programming models (e.g., Open Computing Language (OpenCL), SYCL). As used herein, "machine-readable medium" refers to any computer program product, apparatus, and/or device (e.g., magnetic disks, optical disks, solid-state drives, random access memory (RAM), read-only memory (ROM), Flash, electrically erasable programmable read-only memory (EEPROM), non-volatile memory express (NVMe), three-dimensional XPoint (3D XPoint), magnetoresistive random-access memory (MRAM), phase-change random-access memory (PCRAM), and programmable logic devices (PLDs)) used to provide machine instructions and/or data to a programmable processor, including via a machine-readable signal. A "machine-readable signal" refers to any signal used to provide machine instructions and/or data to a programmable processor, including wired and wireless signals.

Storage systems can include volatile and non-volatile memory; local, network-attached, and distributed storage; file, block, and object stores; databases (relational, non-relational (NoSQL), graph, time-series), data warehouses, and data lakes. Processing and storage can be organized using virtualization and isolation technologies including hypervisors, virtual machines, containers, container orchestration systems, serverless functions, sandboxes, unikernels, and WebAssembly runtimes. Deployment and lifecycle management can utilize infrastructure-as-code, configuration management, continuous integration/continuous deployment (CI/CD) pipelines, and observability tooling (logging, metrics, tracing). Implementations can leverage security hardware and services such as trusted platform modules (TPMs), hardware security modules (HSMs), secure enclaves/trusted execution environments (TEEs), cryptographic modules, and identity and access management systems; and can employ encryption in transit and at rest, attestation, code signing, and secure boot.

To provide for interaction with a user, the subject matter can be implemented on devices with displays (e.g., light-emitting diode (LED), liquid crystal display (LCD), organic light-emitting diode (OLED), electronic ink (e-ink), augmented reality (AR), virtual reality (VR), mixed reality (MR) headsets) and input mechanisms (e.g., keyboard, mouse, trackball, touchpad, touchscreen, stylus, game controller, remote control). Additional input and feedback modalities can include microphones, speakers, cameras, depth sensors, biometric sensors, haptic devices, eye tracking, gesture recognition, voice assistants, and brain-computer interfaces. Feedback can be visual, auditory, haptic, or multimodal. Implementations can support accessibility features (e.g., screen readers, captioning, alternative input).

The subject matter can be implemented in a computing system including back-end components (e.g., data servers, storage clusters, compute clusters, artificial intelligence (AI) training/inference services), middleware components (e.g., application servers, message brokers, application programming interface (API) gateways, event streams), and/or front-end components (e.g., client applications, web browsers, mobile applications (apps), thin clients), or any combination thereof. Components can be interconnected by any form or medium of digital data communication, including wired and wireless networks and protocols such as Ethernet, Infini-Band, controller area network (CAN) bus, wireless fidelity (Wi-Fi), Bluetooth/Bluetooth Low Energy (BLE), near-field communication (NFC), Zigbee, Z-Wave, long range (LoRa)/LoRa wide area network (LoRaWAN), cellular (third generation (3G), fourth generation (4G), fifth generation (5G), sixth generation (6G)), satellite, mesh networks, and the Internet. Protocols can include transmission control protocol/internet protocol (TCP/IP), user datagram protocol (UDP), quick UDP internet connections (QUIC), hypertext transfer protocol (HTTP/2-HTTP/3), WebSockets, gRPC (gRPC remote procedure calls), message queuing telemetry transport (MQTT), advanced message queuing protocol (AMQP), constrained application protocol (CoAP), and industrial protocols. Systems can employ software-defined networking, load balancing, content delivery networks, caches, and time synchronization (e.g., network time protocol (NTP), precision time protocol (PTP)). Processing can occur centrally, at the edge, on-device, or in federated and/or privacy-preserving arrangements, and can support online, offline, batch, streaming, and real-time modes.

The computing system can include clients, servers, and other interconnected components that may be distributed across various physical or virtual locations. Clients and servers can be remote from each other and typically interact through one or more communication networks, which can include local area networks, wide area networks, the Internet, or wireless and mobile networks. Clients can include desktop computers, laptops, mobile devices, web browsers, thin clients, IoT devices, or edge nodes, while servers can include physical or virtual machines, cloud-based instances, microservices, containers, or serverless functions. The client-server relationship can be established by computer programs running on the respective devices, enabling communication, data exchange, and service orchestration. Modern computing environments can support multiple tiers and roles, such as peer-to-peer, edge-to-cloud, and hybrid architectures, where clients and servers may dynamically assume different roles, participate in distributed processing, and interact with middleware, APIs, and other services. These systems can leverage load balancing, failover, replication, and autoscaling to provide robust, scalable, and resilient operation across diverse deployment models.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more data processors comprising:

monitoring, by an agent executing on a monitored computing device, runtime execution data associated with a process;

determining, based on the runtime execution data, that the process is associated with a ransomware attack, the determining that the process is associated with a ransomware attack comprising detecting a plurality of ransomware-indicative behavioral signals including two or more of: attempts to disable security services, privilege escalation attempts, deletion of backups or shadow copies, high-volume sequential file read/write operations, file renaming with suspicious extensions, or communications with external command-and-control servers;

suspending the process by issuing a kernel-mode thread suspension request that atomically halts all threads of the process while preserving in-memory cryptographic key material;

determining resources used by the process prior to suspension, including enumerating at least memory pages and active network sockets associated with the process; and creating a package characterizing the process and the determined resources used by the process, the package including a manifest of cryptographic hashes of the enumerated resources and a digital signature generated using a device-specific private key, the package being used to thwart future ransomware attacks.

2. The method of claim 1, wherein monitoring the runtime execution data comprises intercepting system-call events indicative of file-system encryption behavior.

3. The method of claim 1, wherein suspending the process comprises issuing a kernel-mode thread suspension request that atomically halts all threads of the process.

4. The method of claim 1, wherein determining resources comprises enumerating at least one of: memory pages, loaded executable modules, open file handles, registry keys, named pipes, mutexes, and active network sockets associated with the process.

5. The method of claim 1, wherein creating the package further comprises computing a cryptographic hash of each enumerated resource and embedding the hashes within a manifest of the package.

6. The method of claim 1, further comprising digitally signing the package with a device-specific private key to enable subsequent integrity verification.

7. The method of claim 1, further comprising transmitting the package to a remote analysis service over a mutually authenticated secure channel established using mutual Transport Layer Security with client certificate validation.

8. The method of claim 7, further comprising, at the remote analysis service, reconstructing an in-memory image of the suspended process from the package and automatically extracting cryptographic keys used by the ransomware attack.

9. The method of claim 8, further comprising disseminating the extracted cryptographic keys to a plurality of additional computing devices to decrypt data encrypted by the ransomware attack, wherein disseminating comprises transmitting a surveyor package containing decryptor logic specific to the identified ransomware variant to each of the plurality of additional computing devices over respective mutually authenticated secure channels.

10. The method of claim 1, further comprising, after creating the package, terminating the suspended process to prevent continuation of the ransomware attack.

11. The method of claim 1, wherein creating the package further comprises compressing and encrypting the package using symmetric encryption with an AES-256 session key, the session key being wrapped by a public-key infrastructure certificate tied to a security operations center account using RSA-OAEP or ECIES key encapsulation.

12. The method of claim 1, wherein the package includes a replay script operable to recreate the process in a sandbox environment for behavioral analysis.

13. The method of claim 1, wherein determining that the process is associated with a ransomware attack comprises applying a machine-learning classifier trained on historical ransomware execution profiles.

14. The method of claim 1, further comprising updating a ransomware-detection model based on behavioral features extracted from the package, wherein updating the ransomware-detection model comprises retraining at least one machine-learning classifier using behavioral embeddings derived from API call sequences and memory access patterns captured in the package.

15. The method of claim 1, wherein the agent stores a reference to a temporal data-protection journal such that, upon extraction of decryption keys from the package, encrypted files are rolled back to a pre-encryption state.

16. A method for transactionally suspending and archiving a suspected ransomware process on a computing device, the method being implemented by one or more data processors and comprising:

monitoring runtime events associated with a process and, responsive to determining that the process exhibits behavior indicative of ransomware initiating a suspension protocol, the monitored runtime events including two or more of: attempts to disable security services, privilege escalation attempts, deletion of backups or shadow copies, high-volume sequential file read/write operations, file renaming with suspicious extensions, or communications with external command-and-control servers;

during the suspension protocol, issuing a kernel-mode request that atomically halts all threads of the process while preserving in-memory cryptographic key material;

prior to or contemporaneously with the suspension, storing, in a temporal data-protection journal, information sufficient to roll back file modifications associated with the process;

determining resources used by the process prior to suspension; and creating a package that characterizes the process and the determined resources, the package including a manifest of cryptographic hashes of the resources and a digital signature and being usable to thwart ransomware activity.

17. The method of claim 16, wherein monitoring the runtime events comprises intercepting system-call events indicative of file-system encryption behavior and detecting authentication anomalies comprising at least one of failed login attempts exceeding a threshold count within a time window or logins from geographically anomalous locations.

18. The method of claim 16, wherein determining the resources comprises enumerating at least one of: memory pages, loaded executable modules, open file handles, registry keys, named pipes, mutexes, and active network sockets associated with the process.

19. The method of claim 16, wherein the package further comprises a replay script operable to recreate the process in a sandbox environment for behavioral analysis.

20. The method of claim 16, further comprising transmitting the package to a remote analysis service over a mutually authenticated secure channel established using mutual Transport Layer Security with client certificate validation and, at the remote analysis service, reconstructing an in-memory image of the suspended process from the package to automatically extract cryptographic keys used by the process.

21. The method of claim 20, further comprising disseminating the extracted cryptographic keys to additional computing devices to decrypt data encrypted by the process, wherein disseminating comprises transmitting a surveyor package containing decryptor logic specific to the identified ransomware variant to each of the additional computing devices over respective mutually authenticated secure channels, and instructing the computing device to terminate the suspended process.

22. A method for coordinated ransomware response performed by a monitoring platform, the method being implemented by one or more data processors and comprising:

receiving telemetry from a plurality of computing devices, the telemetry including runtime execution data associated with processes;

deriving, based on the telemetry, a risk level indicating a likelihood that a particular process on a particular computing device is associated with a ransomware attack, wherein deriving the risk level comprises aggregating behavioral signals across the plurality of computing devices and applying a multi-factor scoring algorithm that weights at least process privilege level, cryptographic API invocation frequency, and network egress anomalies;

responsive to the risk level exceeding a threshold, transmitting a command to an agent on the particular computing device to suspend the particular process by issuing a kernel-mode thread suspension request that atomically halts all threads while preserving in-memory cryptographic key material, determine resources used by the process prior to suspension, and generate a package characterizing the process and the determined resources;

receiving the package from the particular computing device;

reconstructing, from the package, an in-memory image of the suspended process and automatically extracting cryptographic keys used by the ransomware attack; and disseminating the extracted cryptographic keys to one or more computing devices to decrypt data encrypted by the ransomware attack, the disseminating comprising transmitting a surveyor package containing decryptor logic specific to the identified ransomware variant to each of the one or more computing devices.

23. The method of claim 22, wherein deriving the risk level comprises aggregating telemetry across the plurality of computing devices including at least one of: login timestamps, login failure counts, login locations, network folder access requests, network file enumeration requests, privileged process access requests, and modifications to system settings.

24. The method of claim 22, wherein the transmitted command further causes the agent to store a reference to a temporal data-protection journal such that, upon receipt of the disseminated cryptographic keys, encrypted files are rolled back to a pre-encryption state.

25. The method of claim 22, further comprising generating decryptor logic as a surveyor package and delivering the surveyor package to the agent to cause decryption of encrypted files on the particular computing device.

26. The method of claim 22, further comprising, responsive to the risk level exceeding the threshold, adjusting authentication techniques for at least one application, process, or computing device via an authentication platform, wherein adjusting authentication techniques comprises dynamically escalating from single-factor authentication to multi-factor authentication requiring at least a hardware token or biometric verification.

27. The method of claim 22, wherein reconstructing the in-memory image comprises rehydrating the process in a sandbox environment and executing a replay script included in the package.

28. The method of claim 22, wherein disseminating the extracted cryptographic keys to the one or more computing devices is performed over a mutually authenticated secure channel established using mutual Transport Layer Security with client certificate validation.

29. The method of claim 22, further comprising updating a ransomware-detection model based on behavioral features extracted from the package, wherein updating the ransomware-detection model comprises retraining at least one machine-learning classifier using behavioral embeddings derived from API call sequences and memory access patterns captured in the package, and transmitting an updated model to at least a subset of the plurality of computing devices.

30. The method of claim 22, further comprising, after dissemination of the extracted cryptographic keys or completion of decryption, transmitting an instruction to the agent on the particular computing device to terminate the suspended process.

\* \* \* \* \*